United States Patent
Shah et al.

(10) Patent No.: US 11,640,164 B2
(45) Date of Patent: May 2, 2023

(54) PREDICTING RISK OF MACHINE COMPONENTS NOT ACHIEVING AGREED LIFE SYSTEMS AND METHODS

(71) Applicant: Caterpillar Inc., Peoria, IL (US)

(72) Inventors: Harsheel R. Shah, Urbana, IL (US); Chanyoung Park, Savoy, IL (US)

(73) Assignee: Caterpillar Inc., Peoria, IL (US)

( * ) Notice: Subject to any disclaimer, the term of this patent is extended or adjusted under 35 U.S.C. 154(b) by 98 days.

(21) Appl. No.: 17/219,710

(22) Filed: Mar. 31, 2021

(65) Prior Publication Data
US 2022/0317677 A1  Oct. 6, 2022

(51) Int. Cl.
*G05B 23/02* (2006.01)

(52) U.S. Cl.
CPC ..... *G05B 23/0283* (2013.01); *G05B 23/0227* (2013.01); *G05B 23/0294* (2013.01)

(58) Field of Classification Search
CPC ............ G05B 23/0283; G05B 23/0227; G05B 23/0294
See application file for complete search history.

(56) References Cited

U.S. PATENT DOCUMENTS

| | | | |
|---|---|---|---|
| 8,510,060 B2* | 8/2013 | Hardwicke | G05B 23/0283 702/34 |
| 2022/0082090 A1* | 3/2022 | Kumar | G05B 17/02 |
| 2022/0214680 A1* | 7/2022 | Nair | H01H 3/16 |

* cited by examiner

*Primary Examiner* — Manuel L Barbee
(74) *Attorney, Agent, or Firm* — Xsensus LLC

(57) ABSTRACT

The present disclosure is directed to systems and methods for predicting risk of machine components not achieving their agreed life based on historical data. In some implementations, the predicting component risk system can obtain historical component specific time series data and component life data that correspond to a specific component of a type of machine. Using the component specific time series data and component life data, the predicting component risk system can train a time-series model. After training the model, the predicting component risk system can obtain current component specific data that includes information on the current condition and usage of the component. Using the trained time-series model, the predicting component risk system can determine a risk score for the current component specific data and notify maintenance entities of the risk. The risk score can represent the risk that the specific component does not achieve agreed life.

20 Claims, 4 Drawing Sheets

PREDICTING RISK OF MACHINE COMPONENTS NOT ACHIEVING AGREED LIFE SYSTEMS AND METHODS

TECHNICAL FIELD

The present disclosure is directed to a system and method for predicting risk of machine components not achieving their agreed life based on historical data.

BACKGROUND

The costs associated with owning and maintaining a machine is driven often by the machine's availability. A machine's availability typically relies on the health and availability of its individual components, or "machine components" (e.g., the engine, battery, transmission, structural components). Machine components that do not achieve their agreed life (getting less life, value, and time out of the component than what the owner had been originally sold on or agreed to) or maximum life potential risk getting replaced or rebuilt prematurely. This can pose as a potential commercial risk to owners (e.g., customers, dealers) depending on value agreements. Depending on the industrial area, the costs of component failure can be in the hundreds of thousands per day. As a result, component condition monitoring is of importance to avoid unplanned downtime that may result from machine component wear out or deterioration.

In some instances, dealers make an agreement for the life of components with customers. If a component does not achieve the agreed life, the dealer may have to pay the replacement cost for the customer. For dealers, risk prediction and warning customers are means to avoid such costs and unpredictable responsibilities. Existing systems and methods lack ways to estimate the risk of machine components being replaced or rebuilt earlier than a percentage of agreed life.

It is with respect to these and other general considerations that the aspects disclosed herein have been made. Also, although relatively specific problems may be discussed, it should be understood that the examples should not be limited to solving the specific problems identified in the background or elsewhere in the disclosure.

SUMMARY

According to a first aspect, a system can include processors and memories storying instructions that when executed by the processors, cause the system to perform a process. The process can include receiving component specific time series data records from machine entities and generating model inputs based on the component specific time series data records and component life data records. The process can also include applying the model inputs to a time-series model and updating model parameters to train the time-series model. The process can also include receiving a current component specific data record from the machine entities and generating a predicted life of the component for the current component specific data record. The process can generate the predicted life by generating a model input based on the current component specific data record and applying the model input to the time-series model trained to produce predicted life. The process can further include determining a risk score for the component based on the agreed life and the predicted life of the component.

According to a further aspect, a method can include receiving component specific time series data records from machine entities and generating model inputs based on the component specific time series data records and component life data records. The method can also include applying the model inputs to a time-series model and updating model parameters to train the time-series model. The method can also include receiving a current component specific data record from the machine entities and generating a predicted life of the component for the current component specific data record. The method can generate the predicted life by generating a model input based on the current component specific data record and applying the model input to the time-series model trained to produce predicted life. The method can further include determining a risk score for the component based on the agreed life and the predicted life of the component.

According to another aspect, a computer-readable storage medium can store non-transitory computer executable instructions that when executed by a computing system, cause the computing system to perform a process. The process can also include applying the model inputs to a time-series model and updating model parameters to train the time-series model. The process can also include receiving a current component specific data record from the machine entities and generating a predicted life of the component for the current component specific data record. The process can generate the predicted life by generating a model input based on the current component specific data record and applying the model input to the time-series model trained to produce predicted life. The process can further include determining a risk score for the component based on the agreed life and the predicted life of the component.

BRIEF DESCRIPTION OF THE DRAWINGS

Non-limiting and non-exhaustive examples are described with reference to the following figures.

The techniques introduced here may be better understood by referring to the following Detailed Description in conjunction with the accompanying drawings, in which like reference numerals indicate identical or functionally similar elements.

DETAILED DESCRIPTION

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Figure 1:
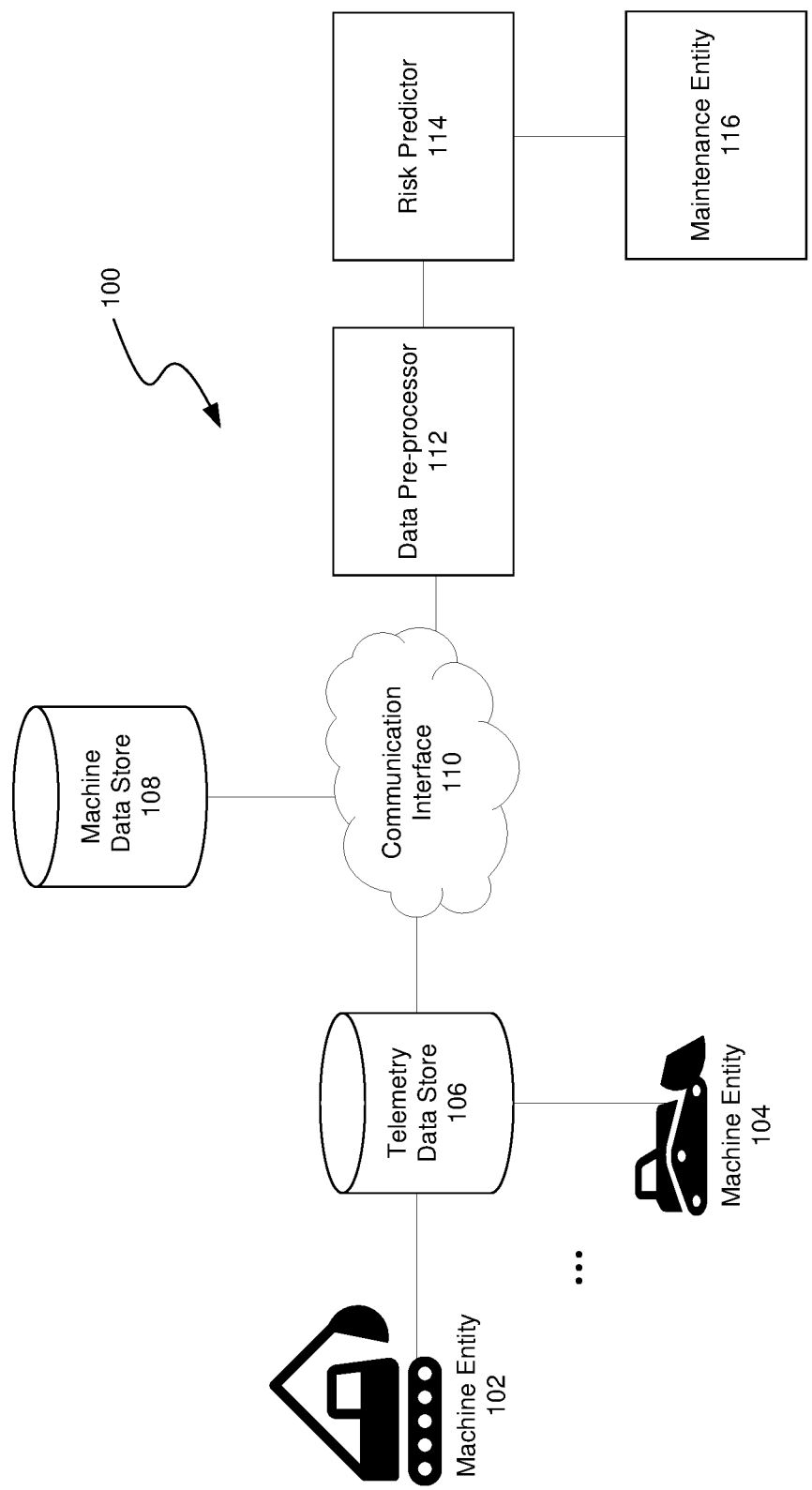
FIG. 1 is a block diagram illustrating components which, in some implementations, can be used in a predicting component risk system.

FIG. 1 is a block diagram illustrating components which, in some implementations, can be used in a predicting component risk system 100. As used herein, "risk" is the estimated risk of the component of a machine not achieving agreed life. Agreed life can be the agreed amount of time (e.g., between sellers and buyers, dealers and owners, maintenance and owners, planners and operators etc.) a component has until need for replacement or repair. Machine entities 102 and 104 of the predicting component risk system 100 can be any telematics-enabled industrial machinery, vehicle, equipment, or device. For example, machine entity 102 can be an excavator, while machine entity 104 can be a bulldozer. Other machine entities of the predicting component risk system 100 can include, but are not limited to, dump trucks, cement trucks, trucks, asphalt pavers, backhoe loaders, cold planers, compactors, dozers, draglines, drills, rope shovels, mining shovels, material handlers, motor graders, pipelayers, road reclaimers, track loaders, telehandlers, track loaders, mining trucks, conveyers, utility vehicles, wheel loaders, tractors, or scrapers.

Each of the machine entities can be configured to collect telemetry data, using one or more sensors, and store the data in telemetry data store 106. The machine entities can subsequently transmit the telemetry data wirelessly or wired across communication interface 110 to receiving entities for monitoring, storing, or evaluating. For example, machine entity 102 can use engine sensors to monitor various parameters and functions, and then transmit any collected data or information as telemetry data. Telemetry data can provide information regarding the operational conditions and usage of the corresponding specific component it was collected from at various time instances. The predicting component risk analysis system can collect telemetry data via sensors on the machine entities and perform further analysis.

Types of telemetry data records can include, but are not limited to, component condition data, component usage data, component structural integrity data, component durability data, performance data, oil level data, oil sampling data, oil usage data, battery level data, battery condition data, battery usage data, engine condition data, engine usage data, temperature data, time of usage data, service meter unit data, normative behavior data, operation warning error data, fault code data, location data, proximity data, and/or other sensory data.

Component condition or usage data is data that can indicate the condition of a parameter (e.g., measured temperature, vibration, lubrication, acoustic emission, infrared thermography, ultrasound, motor voltage or current, motor current signature analysis, RPM) of a component in a machine entity (e.g., rotating equipment, auxiliary system, compressor, pump, motor, internal combustion engine, press). Component structural integrity or durability data can indicate the ability of a component of a machine entity to withstand its intended loading without failing due to fracture, deformation, or fatigue (e.g., measured stress, load, strength, force, weight, intensity of excavator bucket, hydraulic ram, crane). Performance data is data that can indicate the performance of a component in a machine entity (e.g., calculated energy efficiency, utilization, actual vs. ideal component measurements from sensor).

Oil level data is data that can indicate the actual, approximate, or relative volume of oil within oil repositories of a machine entity (e.g., volumetric amount from sensor). Oil sampling data or condition data is data that can indicate the properties (e.g., viscosity, compounds, lubrication), contaminants, and wear debris of oil within oil repositories of a machine entity. Battery level data is data that can indicate the actual, approximate, or relative capacity of batteries in a machine entity (e.g., amperes, state of charge, voltage, current). Battery condition or usage data is data that can indicate the degradation (e.g., cracks, leaks, corrosion, sedimentation, electrolyte level), age, internal resistance, capacity, specific gravity, voltages, temperature, or connection resistance of batteries within a machine entity. Engine condition or usage data is data that can indicate the condition or usage of a machine engine (e.g., inlet pressure, lube oil pressure, bleed air pressure, compressor pressure, exhaust gas temperature, vibration of bearings, transmission vibration, mechanical performance, RPM, exhaust gas temperature, fuel flow, engine pressure ratio, throttle position, fatigues, stresses, cracks).

Temperature data is data that can indicate the temperature of a component of a machine entity (e.g., thermometer, thermostat, humidity measurements). Time of use data is data that can indicate when a component of a machine entity was switched on or off (e.g., in operation or not in operation). Service meter unit data is data that can indicate how long the component of the machine entity has been in operation (e.g., minutes, hours, days, weeks, months, years) as recorded by an equipment service meter. Normative behavior data is data that can indicate when a machine entity is operating properly (e.g., indication when machine completes a task successfully, indication when sensor measurements are in equilibrium or reached a steady-state). Operation warning error data is data that can indicate when a machine entity fails to operate properly (e.g., indication when machine fails a task, sensor measurements are all outliers and deviations from the norm). Fault code data is data that can indicate when the on-board computer diagnostic system transmitted a problem found in a machine entity (e.g., uniquely specified codes mapping to specific failures).

Location data is data that can indicate the geographic location of a machine entity (e.g., GPS coordinates, address, longitude, latitude). Proximity data is data that can indicate the geographic proximity of a machine entity in relation to other machine entities or industrial facilities (e.g., construction site, farm, mining/drilling zone). Other sensory data can be any data collected from acoustic, vibration, sound, automotive, chemical, electrical, environmental, moisture, humidity, flow, fluid, radiation, navigation, kinematics, optical, imaging, pressure, force, thermal, proximity, speed, or volumetric sensors.

In some implementations, the machine entity can transmit telemetry data when one of its components undergoes a change. For example, the machine, vehicle, equipment, or device can detect a change in oil level, temperature, engine performance, or battery level using its sensors and transmit that as telemetry data. As another example, the machine, vehicle, equipment, or device can be prompted to transmit data regarding warning error flashes during the operation of its components to indicate nonnormative behavior (e.g., collision, operation error, off-roading, irregular oil levels, irregular performance levels, unstable engine) observed by sensors. In other implementations, the machine entity can transmit telemetry data on a scheduled or regular basis. The schedule can be monthly, yearly, daily, hourly, by the minute, every second, or any regular time interval. For example, machine entity 102 (the excavator) can transmit telemetry data regarding how much dirt it has shoveled every hour, machine entity 104 (the bulldozer) can transmit telemetry data regarding how much distance it has traveled every month, a dump truck entity can transmit telemetry data regarding the weight of dumps it has carried every year, and a cement truck entity can transmit telemetry data regarding the amount of cement it can mix per minute.

The telemetry data that is transmitted can also inform about the degree of activity of a machine entity's components. A machine entity transmitting telemetry data of high degree of change in oil levels and battery levels can indicate its components are engaged in a high-performance activity. A machine entity transmitting telemetry data indicating a constant fuel level or energy capacity can indicate its components have been dormant. The first time a machine entity has transmitted telemetry data regarding time of use can indicate the age of its components. A machine entity transmitting telemetry data regarding steady levels of performance and few warning errors can indicate its components are being regularly serviced and maintained. Each telemetry data record can also be timestamped (the time that the telemetry data record was collected by the machine entity) to form a time series (i.e., telemetry time series data) for a component of a machine entity. For example, engine usage and condition data records can each be timestamped to form a time series representing the change in engine usage and condition over time.

Communication interface 110 of the predicting component risk system 100 can be configured to receive telemetry data, from machine entities (e.g., machine entity 102, 104), stored in telemetry data store 106 and obtain industrial worksite data and component lifecycle data from machine data store 108. Communication interface 110 can receive the telemetry data wirelessly, wired, over a cloud, or over any communication network. Furthermore, communication interface 110 can be configured to receive the telemetry data in parallel or sequentially. In some implementations, communication interface 110 can filter the telemetry data to only accept telemetry data associated with machine entities that have entries in the machine data store. For example, telemetry data received from a machine entity that currently exists in machine data store 108 can be accepted, while telemetry data received from a machine entity that does not have an entry in machine data store 108 can be filtered out.

Industrial worksite data can encompass any data or information related to the work and activity being performed by a corresponding machine entity (e.g., machine entity 102, 104) at an industrial site. Examples of industrial worksite data records can include, but are not limited to, bulldozing activity data, shoveling activity data, dumping activity data, storing activity data, mixing activity data, transporting activity data, machine activity data, construction activity data, infrastructure activity data, and landscaping activity data.

Each industrial worksite data record can indicate whether a machine entity was performing that activity and also the degree of the activity. For example, the industrial worksite data record can include an indicator variable (0 or 1) for whether a machine entity was bulldozing, shoveling, dumping, storing, mixing, transporting, performing construction, building or maintaining infrastructure. The industrial worksite data record can also include a score for the degree of the activity (e.g., score of 1 to 5, 1 being least intense, 5 being most intense activity). For example, an industrial worksite data record with a score of 4 for shoveling activity can indicate that an excavator is shoveling a lot of dirt in a short period, while an industrial worksite data record with a score of 1 for bulldozing activity can indicate that a bulldozer is inactive. Both telemetry data and industrial worksite data of the machine entities can provide information and data regarding the condition and usage of components of the machine entities. Each industrial worksite data record can be timestamped (the time that the industrial worksite data record was collected by the machine entity) to form a time series for a component of a machine entity (i.e., industrial worksite time series data). For example, bulldozing activity of a machine entity at an instance can be timestamped to form a time series representing the change in the degree of bulldozing activity over time.

Component lifecycle data can encompass any data or information related to the health/life of components of machine entities, such as machine entity 102 and 104, over cycles of its lifespan. Examples of component lifecycle data records can include, but are not limited to, component ownership or dealership data, component operation history data, component service history data, component maintenance history data, component repair history data, component inspection history data, component replacement history data, component benchmark data, component health data, predicted life of the component or life before replacement/repair data, and/or predicted component lifespan data.

Component ownership or dealership data is recorded data that can indicate the times ownership or dealership of a component changed. Component operation history data is recorded data that can indicate the times a component was in operation and times when the component failed to operate (e.g., engine failure, battery leakage, transmission malfunction, oil leakage, oil contamination). Component inspection, service, maintenance, or repair history data is recorded data that can indicate the times a component was inspected, serviced, maintained, or repaired (e.g., annual inspection on machine bumpers, wires, ropes, levers, screws, rivets, lifts, pipes, buckets, hooks, wheels, actuators, on-board electronics, or other mechanical components; when an engine was brought in to be repaired; when a transmission system is regularly maintained by mechanics; invoices for work done on component; work order history on the component). Component replacement history data is recorded data that can indicate the times a component was replaced (e.g., dead engine replaced with new engine, degraded battery replaced with new battery, broken mechanical structure replaced with new mechanical structure).

Component benchmark data is data that comes from benchmarking the performance of the component compared against an ideal version of the component (e.g., compared against a simulation of the component's performance over time, compared against a similar component that achieved agreed life). Component health data is data that can indicate how much time the component lasted or was in operation before it was replaced, such as failed or planned replacement (e.g., engine lifespan, battery lifespan, mechanical structure lifespan). Predicted life of the component or life before replacement/repair data is data that can indicate how much time the component has left before its needs to be replaced or repaired (e.g., remaining engine lifespan, remaining battery lifespan, remaining mechanical structure lifespan). Predicted component lifespan data is data that can indicate, via analysis of the component (e.g., manual analysis by analysts based on the telemetry data and/or worksite industrial data), how much predicted time the component has before needing replacement or repair (e.g., predicted engine lifespan, predicted battery lifespan, predicted mechanical structure lifespan).

In some implementations, each component lifecycle data record can be manually recorded (e.g., labeled by hand). In other words, the component lifecycle data records can be ground-truth labels for how much time a specific component has left before needing replacement or repair. Each component lifecycle data record can also be timestamped (the time that the component lifecycle data record was collected or recorded) to form a time series for a component of a machine entity. Some of the component lifecycle data records can correspond to a telemetry data record and/or worksite data record with the same timestamp. For example, the engine health/life at timestamp 3/15/2020, 5:00 PM can correspond to the engine condition and bulldozing activity that also has the timestamp 3/15/2020, 5:00 PM. Component lifecycle data collected can provide information regarding how long before the component needs to be replaced/repaired or how much life the component has left before failing.

Data pre-processor 112 of the predicting component risk system 100 can be configured to pre-process the various different telemetry data, industrial worksite data, and component lifecycle data received from communication interface 110. Data pre-processor 112 can first identify a specific machine type and a specific component of the machine type. For example, data pre-processor 112 can identify a truck machine type and the engine component of the truck. Data pre-processor 112 can then obtain telemetry data, industrial worksite data, and component lifecycle data corresponding to the identified component and machine. For example, data pre-processor 112 can obtain all available telemetry data, industrial worksite data, and component lifecycle data of the engines of trucks. Data pre-processor 112 can designate and use all or a subset of the obtained telemetry data and industrial worksite data as component specific time series data. Furthermore, data pre-processor 112 can designate and use all or a subset of the component lifecycle data as component life/replacement data.

In some implementations, data pre-processor 112 can aggregate the component specific time series data based on its data channels (different types or categories of data collected from different sensors) and collection timestamps (when the data was collected). Data pre-processor 112 can identify different channels of data obtained from different sensors used on the component. Data pre-processor 112 can take the sum, average, weighted average, weighted sum, or standard deviation of component specific time series data records sharing the same data channel and also having timestamps in a same given time range (e.g., same hour, day, week, month, or year).

In some implementations, data pre-processor 112 can generate a predicted life curve for the component based on the component life/replacement data. Using the component life/replacement data and its collection timestamps, data pre-processor 112 can determine the associated component's predicted life. The component's predicted life can be the amount of time a component has until need for replacement or repair. In some implementations, data pre-processor 112 can generate collection timestamp and predicted life of the component pairs (e.g., {collection timestamp, predicted life}). For example, data pre-processor 112 can determine that after using an engine for 1 year it still has 5000 hours left before it needs replacement/repair (e.g., {1 year, 5000 hours of predicted life}), after using the engine for 2 years it has 3000 hours left before it needs replacement/repair (e.g., {2 years, 3000 hours of predicted life}), after using an engine for 3 years it only has 1000 hours left before it needs replacement/repair (e.g., {3 years, 1000 hours of predicted life}), and so on. Data pre-processor 112 can subsequently fit the collection timestamp and predicted life pairs to a line using a linear regression or least-squares method. The fitted curve represents predicted life of the component (i.e., Y values) based on how long the component has been in operation (i.e., X values are the collection timestamps).

In some implementations, data pre-processor 112 can generate model inputs to be used by risk predictor 114. Data pre-processor 112 can obtain the component specific time series data and for each corresponding timestamp identify, using the generated predicted life curve for the specific component, the component's predicted life. Data pre-processor 112 can then generate pairs of component specific data and predicted life (e.g., {component specific data, component's predicted life}) as model inputs, where each element in a pair shares the same timestamp. For example, data pre-processor 112 can obtain engine time series data for 1 year of use, 2 years of use, and 3 years of use. Data pre-processor 112 can then determine, using the predicted life curve, that the component's predicted life (i.e. Y-value) at 1 year of use to be 5000 hours (i.e. X-value), 2 years of use to be 3000 hours, and 3 years of use to be 1000 hours. Data pre-processor 112 can provide the constructed pairs (i.e., {engine data at 1 year, 5000 hours}, {engine data at 2 years, 3000 hours}, {engine data at 3 years, 1000 hours}) as model inputs for risk predictor 114.

Risk predictor 114 can be configured to generate a risk score for a current component specific data record. Risk predictor 114 can use a time-series model that models the relationship between the component specific time series data and the component life/replacement data. Risk predictor 114 can build the time-series model by applying the set of model inputs for a specific component generated by data pre-processor 112 to the time-series model. Risk predictor 114 can train the time-series model by updating one or more of the model's parameters to fit the inputs to the model and output the specific component's remaining health value (i.e., the remaining time before the component needs replacement/repair). In some implementations, the time-series model can comprise an analytical method or a machine learning model.

After building the time-series model, risk predictor 114 can deploy the time-series model to generate risk scores. Risk predictor 114 can receive, from data pre-processor 112, a current component specific data record associated with the specific component of a machine entity (that the time-series model was trained for). Data pre-processor 112 can generate a model input (test data record) for the current component specific data record. Risk predictor 114 can then generate a predicted life of the component value for the current component specific data record by applying the generated model input to the time-series model. After generating the component's predicted life, risk predictor 114 can determine a risk score for the component based on the agreed life and predicted life of the component. In some implementations, the agreed life can be how much agreed time the component has before needing replacement or repair at the timestamp of the current component specific data record. Risk predictor 114 can calculate the difference between the agreed life and the predicted life of the component. Risk predictor 114 can select a bin for the difference from one of many predefined risk bins and assign a risk score. Each risk bin can span a certain range of differences between agreed life and predicted life, and each risk can have an associated risk score. Components with a low difference between agreed life and predicted life can be binned with low risk scores, while components a high difference between agreed life and predicted life can be binned with high risk scores.

In some implementations, after assigning a risk score, risk predictor 114 can determine whether the risk score exceeds a predefined risk threshold. If the generated risk score does exceed the threshold, then risk predictor 114 can transmit a risk alert to maintenance entity 116 that the specific component being evaluated risks not achieving agreed life.

Maintenance entity 116 can be configured to receive risk alerts from risk predictor 114 and in response take corrective actions or planned maintenance on the specific component being evaluated. In some implementations, maintenance entity 116 can plan maintenance or replacement of the specific component being evaluated so as to address the change in the component's health and reduce its risk of not achieving agreed life. By taking proactive measures in response to the risk alert, maintenance entity 116 can prevent unplanned downtime of the specific component being replaced or rebuilt prematurely and increase planned component replacements.

Figure 2:
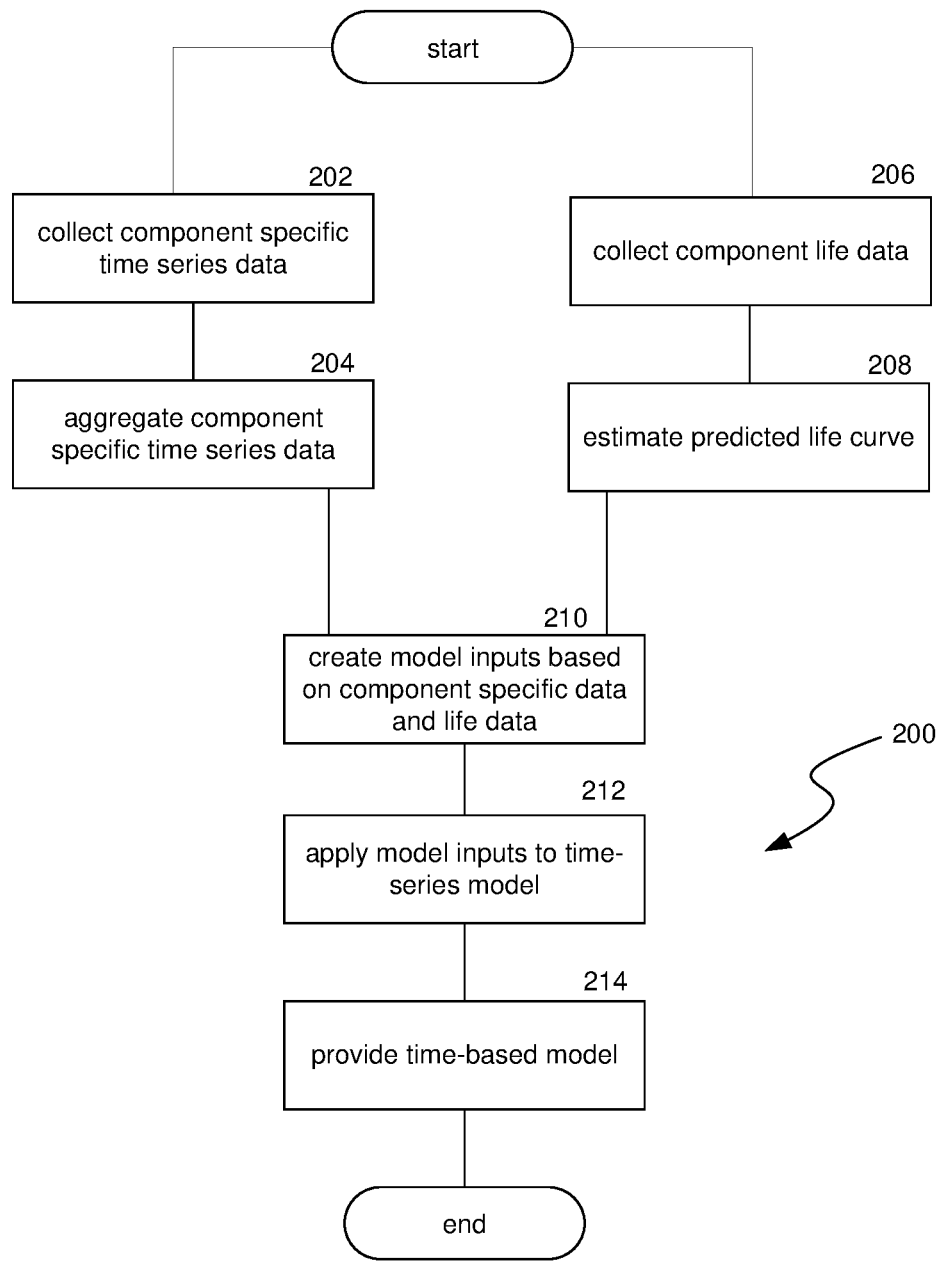
FIG. 2 is a flow diagram illustrating a process used in some implementations for building a time-series model to estimate the risk of a machine component not achieving agreed life.

FIG. 2 is a flow diagram illustrating a process 200 used in some implementations for building a time-series model to estimate the risk of a machine component not achieving agreed life. At block 202, process 200 can collect component specific time series data records associated with a specific component of a machine entity. Component specific time series data records can include, but is not limited to, telemetry time series data records and/or industrial worksite time series data records. Process 200 can collect the component specific time series data records that are associated with a specific component of one or more machine entities of the same machine type. The component specific time series data can be related to the condition and usage of the specific component. For example, the component specific time series data records can include engine usage and condition data records (e.g., speed, thrust, torque, power, efficiency, sound level) and dumping activity data records each timestamped and collected from a dump truck.

At block 204, process 200 can aggregate the component specific time series records of the same data channel/type and in the same time range. The data channel/type can correspond to a specific type or category of data (e.g., battery condition, engine usage, oil level) collected from a sensor (e.g., battery condition sensor, oil level sensor). Process 200 can divide the component specific time series records into groups sharing the same data channel/type and having collection timestamps in the same time range. The time ranges can be predefined ranges of hours, days, weeks, months, or years that a component specific time series record was collected and timestamped. Process 200 can then aggregate the component specific time series data records in each of the groups to generate a set of aggregated time series data records. The aggregation can be a sum, mean, weighted mean, weighted sum, or standard deviation of the component specific time series data records in a group. As an example, an engine can be used for 2000 hours. Process 200 can collect engine time series data records corresponding to the used engine and divide the data records into groups including: engine speed (a data channel/type) in the first 1000 hours of usage (a time range), engine speed in the second 1000 hours of usage, engine efficiency (another data channel/type) in the first 1000 hours of usage (the time range), and engine efficiency in the second 1000 hours of usage. For each group, process 200 can aggregate the data records by computing the sum, weighted sum, mean, weighted mean, or standard deviation of all the data records.

For example, process 200 can compute the mean of the engine speed in the first 1000 hours of usage, the mean of the engine speed in the second 1000 hours of usage, the mean of the engine efficiency in the first 1000 hours of usage, and the mean of the engine efficiency in the second 1000 hours of usage. Process 200 thus generates four aggregated component specific time series data records in this example.

At block 206, process 200 can collect component life/replacement data records. In some implementations, process 200 can perform block 206 in parallel with block 202 or sequentially after/before block 202. The component life/replacement data records can be timestamped based on when it was collected. The component life/replacement data records can include component lifecycle data records that are associated with the same specific component and machine entity as that of the component specific time series data records. The component life/replacement data records can be related to how much time the specific component has until it needs to be replaced/repaired or can no longer function properly. In other words, the component life/replacement data records can represent the predicted life of the corresponding component.

At block 208, process 200 can estimate a predicted life curve using the component life/replacement data records. In some implementations, process 200 can perform block 208 in parallel with block 204 or sequentially after/before block 204. Process 200 can fit the component life/replacement data records to a curve. The predicted life curve's Y-values can be the component's predicted life based on component lifecycle data in the component life/replacement data records, while the X-values can be how long the component has been in operation based on the timestamp of when the component life/replacement data record was collected. Process 200 can fit a linear function or non-linear function based on the trend of the component life/replacement data records. In some implementations, process 200 can fit the curve by using a linear regression, logistic regression, polynomial regression, stepwise regression, ridge regression, or lasso regression.

At block 210, process 200 can create model inputs based on the component specific time series data records and the component life/replacement data records. In some implementations, process 200 can generate an input feature vector for each of the aggregated component specific time series data records. In other implementations, process 200 can generate an input feature vector for each of the component specific time series data records (non-aggregated). The feature vector can be a one-hot encoding, label encoding, original encoding, frequency encoding, binary encoding, mean encoding, ordinal encoding, embedding, or any combination thereof to represent the component specific time series data records or aggregated component specific time series data records. For example, the feature vector can be a combination of a one-hot encoding of an engine component's speed, an embedding of the engine component's efficiency, an original encoding of the oil sample, and a label encoding of the engine component's operating warning errors. After generating an input feature vector, process 200 can create model inputs by generating pairs of feature vector and predicted life (e.g., {feature vector, predicted life}). The component's predicted life can be how much time/health before the component needs to be repaired/replaced. Process 200 can determine the component's predicted life on the estimated predicted life curve (Y-value on the curve) at the same timestamp (X-value on the curve) as the component specific time series data record or aggregated component specific time series data record used to create the feature vector. The model inputs can subsequently be used as training data for training a model to predict the component's remaining health based on the component's usage and condition.

At block 212, process 200 can apply the created model inputs to a time-series model and update one or more model parameters (e.g., weights, bias, coefficients). In other words, process 200 can train a time-series model using the model inputs (the training data). In some implementations, the time-series model can be a neural network, linear regression, linear calibration, random forest, gaussian process, long short-term memory (LSTM), gated recurrent units (GRU), logistic regression, decision tree, gradient boosting, ensemble method, support-vector machine, genetic algorithm, evolutionary programming, or any other machine learning model. The time-series model can use various loss functions including, but not limited to, mean absolute error loss, cross-entropy loss, Huber loss, fair loss, asymmetric loss, or mean square error loss to update its model parameters and carry out training. At block 214, process 200 can provide the trained time-series model, e.g., to process 300 at block 304 of FIG. 3. In other words, after training the time-series model, process 200 can deploy the time-series model to predict the remaining health of a specific component (i.e., time before needing replacement/repair) given its current condition or usage.

Figure 3:
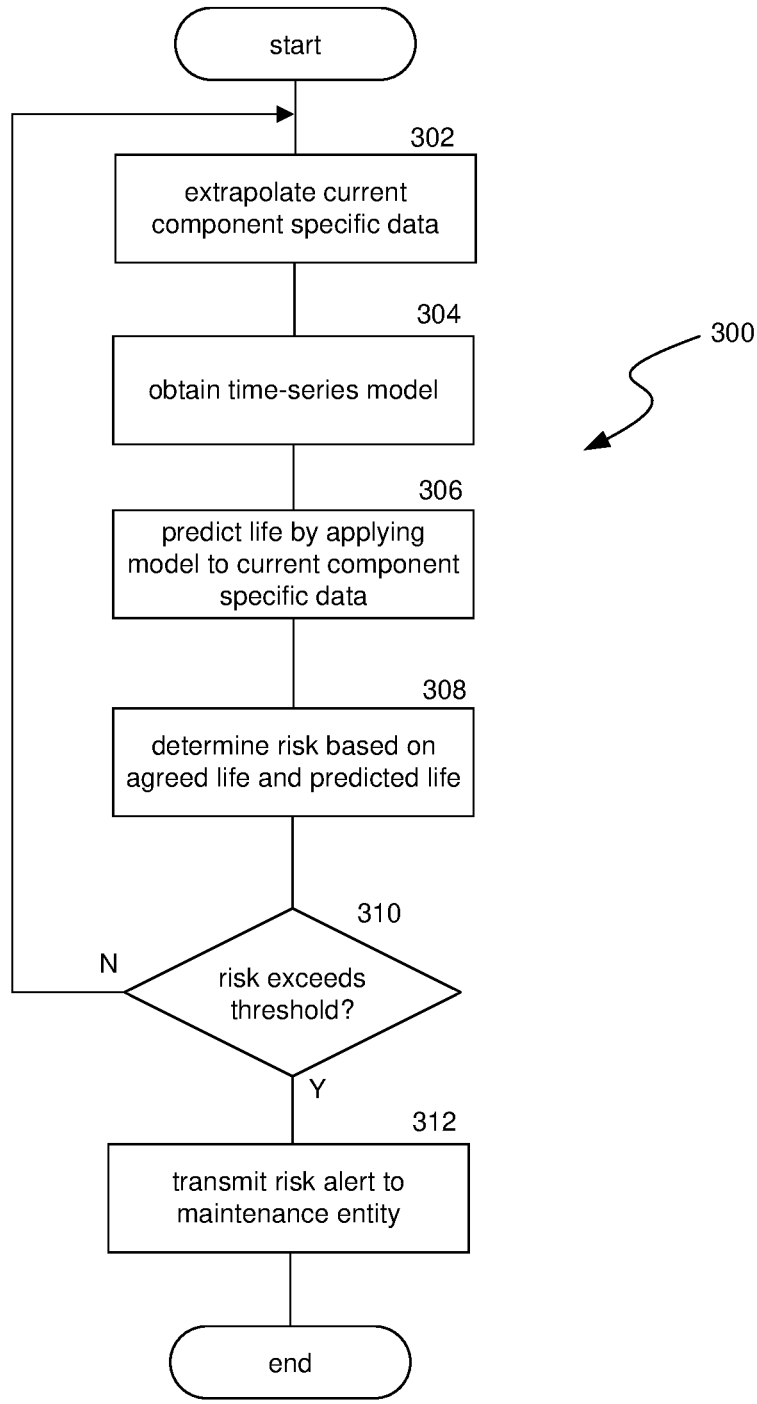
FIG. 3 is a flow diagram illustrating a process used in some implementations for predicting the risk of a machine component not achieving agreed life using a time-series model.

FIG. 3 is a flow diagram illustrating a process 300 used in some implementations for predicting the risk of a machine component not achieving agreed life using a time-series model. At block 302, process 300 can extrapolate a current component specific data record associated with a specific component of a machine entity (e.g., the same component and machine type as that associated with the component specific time series data of block 202 of FIG. 2). The current component specific data record can include telemetry data records and/or industrial worksite data records collected from the corresponding specific component in the present and can represent the component's current condition and usage. At block 304, process 300 can obtain a trained time-series model for predicting the component's remaining health, e.g., from process 200 at block 214 of FIG. 2. The trained time-series model can comprise a trained neural network, linear regression, linear calibration, random forest, gaussian process, long short-term memory (LSTM), gated recurrent units (GRU), logistic regression, decision tree, gradient boosting, ensemble method, support-vector machine, genetic algorithm, evolutionary programming, or any other machine learning model.

At block 306, process 300 can predict the specific component's life by applying the obtained time-series model to the current component specific data. Process 300 can first create a model input for the current component specific data by generating an input feature vector from the current component specific data. The feature vector can be a one-hot encoding, label encoding, original encoding, frequency encoding, binary encoding, mean encoding, ordinal encoding, embedding, any feature representation of the current component specific data, or any combination thereof. The elements or features of the feature vector can correspond to those described in relation to block 210 of FIG. 2. After creating the model input, process 300 can apply the model input to the time-series model to predict the specific component's life. The predicted life can be how long the component has before it needs to be repaired/replaced or can no longer operate properly (component has reached its end of life, which can be before or after the agreed life).

At block 308, process 300 can determine a risk score based on the agreed life and predicted life of the component. Process 300 can first obtain the agreed life of the component. Process 300 can calculate the difference between the agreed life and the predicted life by subtracting the predicted life from the agreed life. The larger the difference, the greater the risk that the component will not achieve agreed life. The smaller the difference, the less the risk that the component will not achieve agreed life. In some implementations, process 300 can obtain a set of bins of differences between agreed life and predicted life, and then identify the bin that the calculated difference falls in. Each bin can have an associated risk score. Process 300 can identify the risk score of the bin that the calculated difference falls in and assign it to be the risk for the corresponding specific component. For example, the bins can be: difference of 8 to 10 thousand hours is assigned a risk score 4, difference of 5 to 7 thousand hours is assigned a risk score of 3, difference of 3 to 4 thousand hours is assigned a risk score of 2, and difference of 0 to 3 thousand hours is assigned a risk score of 1. The larger the difference is, the higher the risk score can be, since this means the component is at a greater risk of not achieving agreed life. The smaller the difference is, the lower the risk score can be, since this means the component is at a lower risk of not achieving agreed life. The risk score can thus represent the predicted risk that the specific component does not achieve agreed life or is replaced before achieving agreed life. The risk score can also be an indication to the machine's owner how soon the specific component of the machine may need to be replaced or repaired (higher score can mean needing sooner replacement/repair).

At block 310, process 300 can determine whether the risk score exceeds a predefined threshold. The predefined threshold can be a threshold risk score that needs to be exceeded and can represent a threshold at which the specific component is at a significant risk of needing replacement. For example, process 300 can determine whether a predicted risk score of 4 exceeds a threshold risk score of 3. In response to determining that the predicted risk score does not exceeds the predefined threshold, process 300 can return back to block 302 to extrapolate a most current component specific data. In response to determining that the predicted risk score does exceed the predefined threshold, process 300 can proceed to block 312.

At block 312, process 300 can transmit a risk alert to a maintenance entity or owner entity. The risk alert can be a notification highlighting that the specific component has had a significant change in health, is at major risk of not achieving agreed life, or needs replacement soon. After receiving the risk alert, the maintenance entity or owner entity can in response take corrective action or planned maintenance on the specific component. For example, process 300 can transmit a risk alert message to an engine repair facility or an owner of the specific engine highlighting that the engine is at a high risk of needing replacement before achieving agreed life and needs to be addressed. In some implementations, process 300 can be repeated to obtain the most current component specific data record (an updated component specific data record) and assess the specific component on a scheduled basis (e.g., hourly, daily, weekly, monthly, quarterly, half-yearly, yearly, etc.). By assessing the specific component on a scheduled basis, process 300 can generate updated risk scores, evaluate the change in the component's health regularly, and prevent possible unplanned failures from large differences between predicted life and agreed life.

Figure 4:
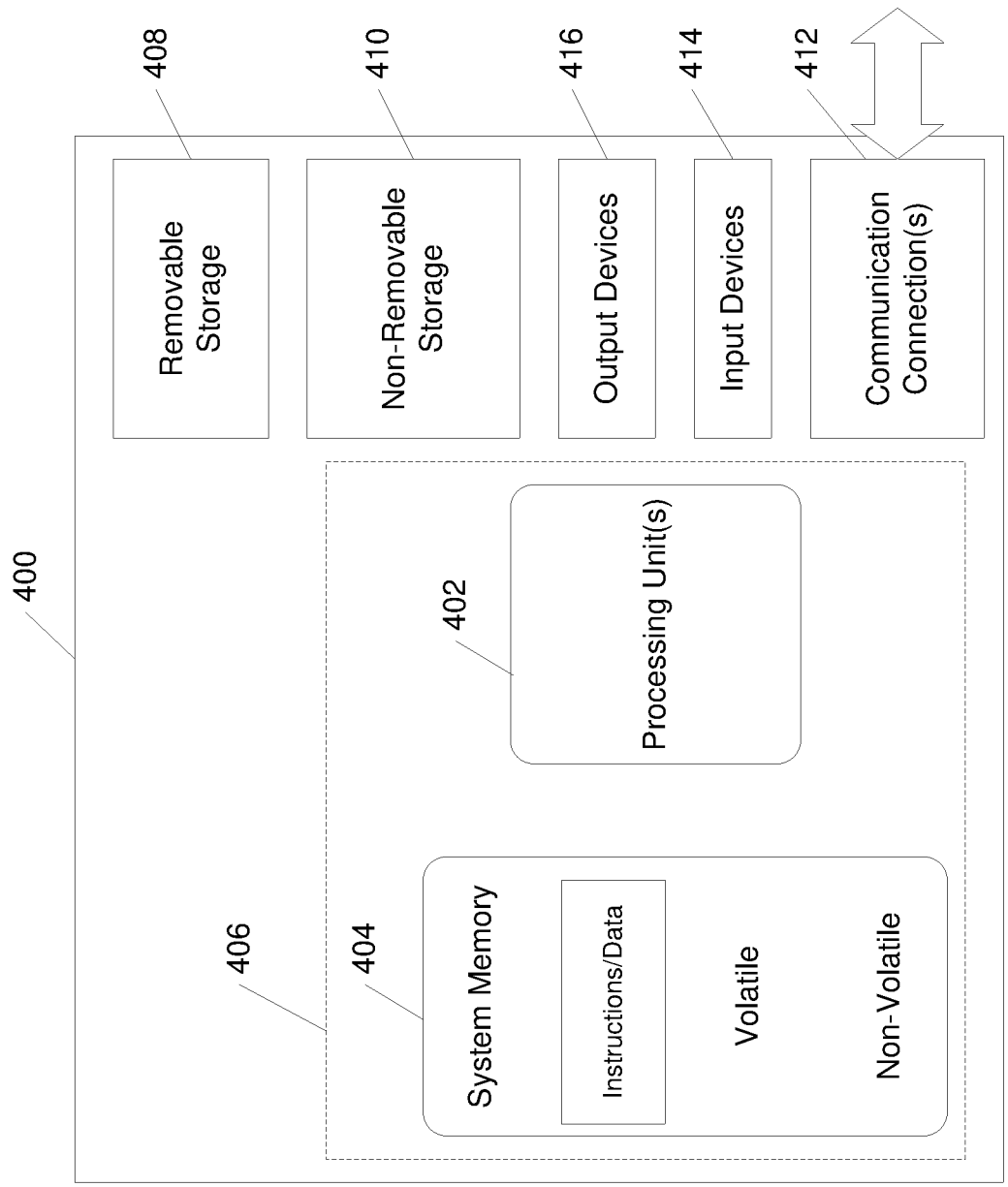
FIG. 4 illustrates one example of a suitable operating environment in which one or more of the present embodiments may be implemented.

FIG. 4 illustrates one example of a suitable operating environment 400 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 400 typically includes at least one processing unit 402 and memory 404. Depending on the exact configuration and type of computing device, memory 404 (storing, among other things, information related to detected devices, association information, personal gateway settings, and instructions to perform the methods disclosed herein) may be volatile (such as RAM), non-volatile (such as ROM, flash memory, etc.), or some combination of the two. This most basic configuration is illustrated in FIG. 4 by dashed line 406. Further, environment 400 may also include storage devices (removable, 408, and/or non-removable, 410) including, but not limited to, magnetic or optical disks or tape. Similarly, environment 400 may also have input device(s) 414 such as keyboard, mouse, pen, voice input, etc. and/or output device(s) 416 such as a display, speakers, printer, etc. Also included in the environment may be one or more communication connections, 412, such as LAN, WAN, point to point, etc.

Operating environment 400 typically includes at least some form of computer readable media. Computer readable media can be any available media that can be accessed by processing unit 402 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies non-transitory computer readable instructions, data structures, program modules, or other data. Computer readable instructions may be transported in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 400 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

INDUSTRIAL APPLICABILITY

Aspects of the present disclosure are directed to a predicting component risk system that can be used for machines in industrial settings. The predicting component risk system can monitor the component conditions and usages of a machine, and subsequently determine the risk that the component does not achieve agreed life. Machine components that do not achieve agreed life can pose many risks for the corresponding machine, such as failing to operate unexpectedly and needing maintenance prematurely. These risks can be unforeseen to owners that, in response, will need to have the component replaced or rebuilt and incur significant costs due to the unplanned machine downtime. The predicting component risk system can include machine entities, a data pre-processor, a risk predictor, and a maintenance entity to deal with such complications and failures.

The machine entities can include telematics-enabled machinery that can transmit telemetry time series data across a communication interface. The data pre-processor can receive the telemetry data from the machine entities, along with industrial worksite time series data and component lifecycle data over the communication interface. The data pre-processor can use the telemetry time series data and industrial worksite time series data for a specific component of the corresponding machine as component specific time series data. By using component specific time series data, the predicting component risk system can determine the condition and usage of the specific component. The data pre-processor can generate a feature vector for the component specific time series data to be used by the risk predictor.

The risk predictor can include a time-series model (e.g., machine learning model, regression model) trained to predict a machine component's life. By using a machine learning model or regression model, the risk predictor can infer relationships between the component's condition/usage and how much health/time is remaining for the component. The time-series model can input component specific time series data and output the predicted life. Based on the difference between agreed life and predicted life of the specific component, the risk predictor can assign a risk score for the specific component. The risk score can represent the risk of the specific component not achieving agreed life.

If the risk score exceeds a predefined risk threshold, the predicting component risk system can alert a maintenance entity of the risk. By alerting a maintenance entity, proactive measures can be taken to increase planned replacements of components and reduce premature component failures. Accordingly, the predicting component risks system can reduce the downtime that may result from a machine component unexpectedly failing or deteriorating before achieving agreed life. Owners of components with high risk can better determine when to schedule maintenance and repairs to minimize/prevent loss of industrial and worksite activity time due to a component's untimely failure or degradation. Through predictive maintenance, the predicting component risk system can allow component of industrial machinery to be better monitored and maintained.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A system comprising:
   one or more processors; and
   one or more memories storing instructions that, when executed by the one or more processors, cause the system to perform a process for predicting risk of machine components being replaced, the process comprising:
   receiving one or more component specific time series data records from one or more machine entities, wherein the one or more component specific time series data records are associated with a component of the one or more machine entities;
   generating a set of model inputs based on the one or more component specific time series data records and one or more component life data records applying the set of model inputs to a time-series model and updating one or more model parameters to train the time-series model;
   receiving a current component specific data record from one of the one or more machine entities, wherein the current component specific data record is associated with the component of the one of the one or more machine entities;
   generating a predicted life of the component for the current component specific data record by:
   generating a model input based on the current component specific data record; and
   applying the model input to the time-series model trained to produce the predicted life of the component; and
   determining a risk score for the component based on an agreed life of the component and the predicted life of the component.

2. The system of claim 1,
   wherein the one or more component specific time series data records comprise one or more telemetry data records; and
   wherein at least one of the one or more telemetry data records is selected from the group consisting of: component condition data, component usage data, component structural integrity data, component durability data, performance data, oil level data, oil sampling data, oil usage data, battery level data, battery condition data, battery usage data, engine condition data, engine usage data, temperature data, time of usage data, service meter unit data, normative behavior data, operation warning error data, fault code data, location data, proximity data, and other sensory data.

3. The system of claim 2,
   wherein the one or more component specific time series data records further comprise one or more industrial worksite data records; and
   wherein at least one of the one or more industrial worksite data records is selected from the group consisting of: bulldozing activity data, shoveling activity data, dumping activity data, storing activity data, mixing activity data, transporting activity data, machine activity data, construction activity data, infrastructure activity data, and landscaping activity data.

4. The system of claim 1,
   wherein the one or more component life data records comprise one or more component lifecycle data records; and
   wherein at least one of the one or more component lifecycle data records is selected from the group consisting of: component ownership or dealership data, component operation history data, component service history data, component maintenance history data, component repair history data, component inspection history data, component replacement history data, component benchmark data, component health data, predicted life of the component before replacement or repair data, and predicted component lifespan data.

5. The system of claim 1, wherein the generating the set of model inputs further comprises:
   dividing the one or more component specific time series data records into one or more groups, wherein each of the one or more groups comprises at least one of the one or more component specific time series data records that share a same data channel and are collected within a same time range;
   aggregating the at least one of the one or more component specific time series data records in each of the one or more groups;
   generating a predicted life curve based on the one or more component life data records; and
   generating the model inputs using the aggregated one or more component specific time series data records and the generated predicted life curve.

6. The system of claim 5, wherein the time range is a number of hours, days, weeks, months, or years.

7. The system of claim 5, wherein the aggregation is a sum, weighted sum, mean, weighted mean, or standard deviation.

8. The system of claim 5, wherein the predicted life curve estimates the predicted life of the component based on how long the component has been in operation.

9. The system of claim 1, further comprising:
  determining that the risk score exceeds a risk threshold; and
  in response to determining that the risk score exceeds the risk threshold, transmitting a risk alert to one or more maintenance entities.

10. A computer-implemented method for predicting risk of machine components being replaced, the method comprising:
  receiving one or more component specific time series data records from one or more machine entities, wherein the one or more component specific time series data records are associated with a component of the one or more machine entities;
  generating a set of model inputs based on the one or more component specific time series data records and one or more component life data records applying the set of model inputs to a time-series model and updating one or more model parameters to train the time-series model;
  receiving a current component specific data record from one of the one or more machine entities, wherein the current component specific data record is associated with the component of the one of the one or more machine entities;
  generating a predicted life of the component for the current component specific data record by:
    generating a model input based on the current component specific data record; and
    applying the model input to the time-series model trained to produce the predicted life of the component; and
  determining a risk score for the component based on an agreed life of the component and the predicted life of the component.

11. The method of claim 10, wherein the risk score measures a risk of the component not achieving the agreed life.

12. The method of claim 10, wherein the determining the risk score for the component comprises:
  calculating a difference between the agreed life and the predicted life of the component;
  identifying a risk bin for the difference; and
  determining the risk score corresponding to the risk bin.

13. The method of claim 10, wherein the time-series model is a machine learning model trained on the set of model inputs to generate the predicted life of the component for the current component specific data record.

14. The method of claim 10, wherein the current component specific data record comprises a current condition or usage of the component.

15. A non-transitory computer-readable storage Medium having stored thereon instructions that, when executed by one or more processors, causes the one or more processors to perform a process for predicting risk of machine components being replaced, the process comprising:
  receiving one or more component specific time series data records from one or more machine entities, wherein the one or more component specific time series data records are associated with a component of the one or more machine entities;
  generating a set of model inputs based on the one or more component specific time series data records and one or more component life data records applying the set of model inputs to a time-series model and updating one or more model parameters to train the time-series model;
  receiving a current component specific data record from one of the one or more machine entities, wherein the current component specific data record is associated with the component of the one of the one or more machine entities;
  generating a predicted life of the component for the current component specific data record by:
    generating a model input based on the current component specific data record; and
    applying the model input to the time-series model trained to produce the predicted life of the component;
  determining a risk score for the component based on the predicted life and an agreed life of the component;
  determining that the risk score exceeds a risk threshold; and
  in response to determining that the risk score exceeds the risk threshold, transmitting a risk alert to one or more maintenance entities.

16. The non-transitory computer-readable storage medium of claim 15, wherein the time-series model is a regression analysis that estimates a relationship between the one or more component specific time series data records and the one or more component life data records.

17. The non-transitory computer-readable storage medium of claim 15, the process further comprising:
  receiving an updated current component specific data record from the one of the one or more machine entities, wherein the updated current component specific data record is associated with the component of the one of the one or more machine entities and is received a predefined time period after the current component specific data record;
  generating an updated predicted life of the component for the updated current component specific data record by:
    generating an updated model input based on the updated current component specific data record; and
    applying the updated model input to the time-series model trained to produce the updated predicted life of the component;
  determining an updated risk score for the component based on the agreed life of the component and the updated predicted life of the component;
  determining that the updated risk score exceeds the risk threshold; and
  in response to determining that the updated risk score exceeds the risk threshold, transmitting an updated risk alert to the one or more maintenance entities.

18. The non-transitory computer-readable storage medium of claim 17, wherein the predefined time period is a predefined number of hours, days, weeks, months, or years.

19. The non-transitory computer-readable storage medium of claim 15, the process further comprising: in response to determining that the risk score exceeds the risk threshold, further transmitting the risk alert to one or more owner entities.

20. The non-transitory computer-readable storage medium of claim 15, wherein the one or more maintenance entities are configured to take corrective actions or planned maintenance on the component in response to receiving the risk alert.

* * * * *